July 18, 1933.  W. F. FABER  1,918,254
REFORMING OF NATURAL GASES
Filed Nov. 29, 1927   3 Sheets-Sheet 1
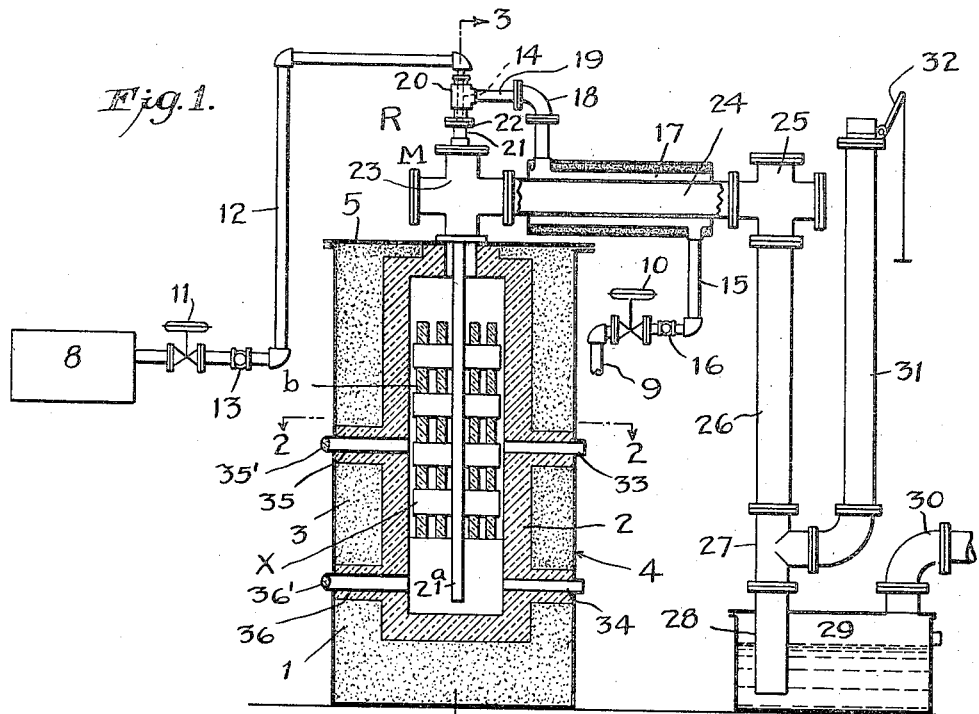
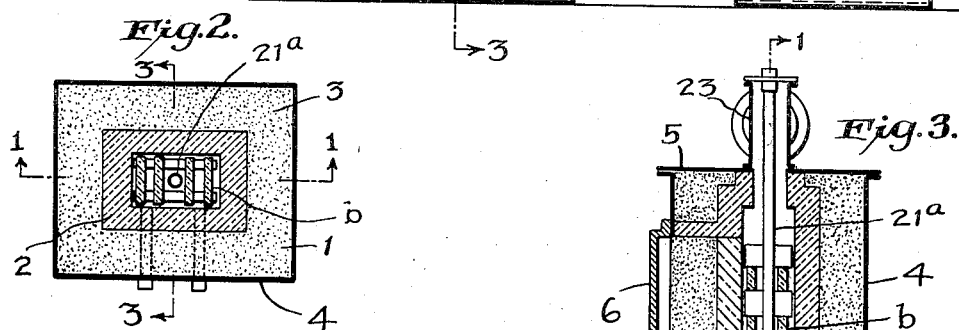
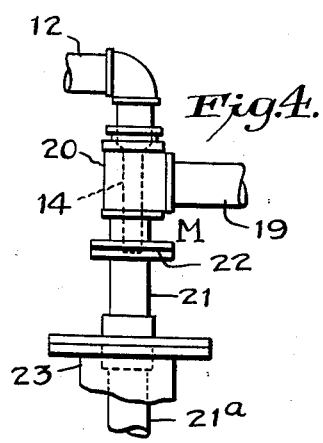
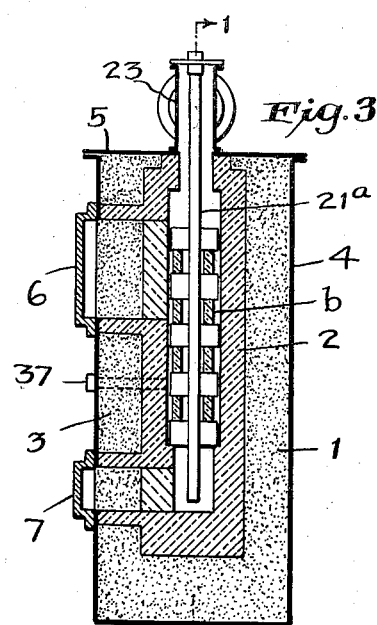
INVENTOR
William F. Faber
BY
Edwin A. Packard
ATTORNEY

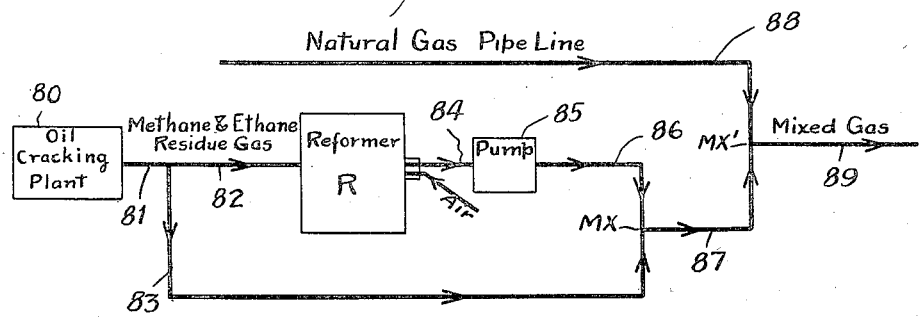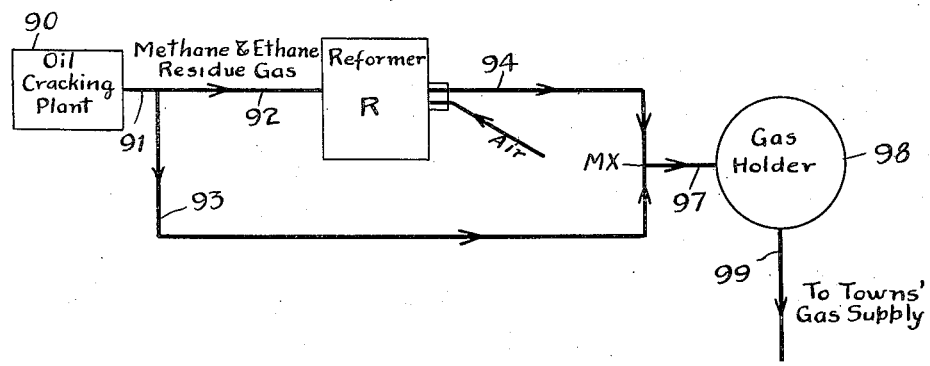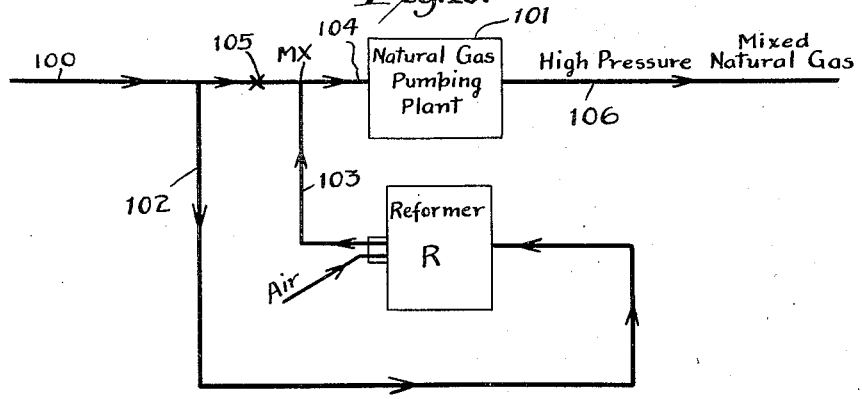

Patented July 18, 1933

1,918,254

UNITED STATES PATENT OFFICE

WILLIAM F. FABER, OF NEWARK, NEW JERSEY, ASSIGNOR TO VICTOR N. ROADSTRUM, OF WEST ORANGE, NEW JERSEY

REFORMING OF NATURAL GASES

Application filed November 29, 1927. Serial No. 236,453.

The invention according to certain aspects or objects thereof relates to the reforming or cracking of gases consisting in the main of hydrocarbons in gaseous form and particularly such gases known as natural gases or those obtained or obtainable therefrom.

Natural gases are obtainable from the earth in many localities. They frequently have quite different characteristics, particularly as to certain constituents thereof or entrained therein and also particularly in regard to the ratio of the varied constituents thereof or therein.

In some places the available natural gases are used as a fuel with little or no special processing or treatment. In other places the natural gases are processed in order to remove therefrom or in order to take or obtain therefrom certain ingredients, as for the purpose of obtaining such products as gasoline. In other localities the petroleum industry has natural gases as a by-product to the liquid petroleum being sought.

In still other localities the gasoline industry, as from the crude gasoline or wild gasoline,—and also by way of example the oil industry—has available as a by-product gases such as methane, ethane, propane, etc. which, for the purposes of the invention are natural gases. As above indicated there are derived from the crude gasoline or wild gasoline, after the latter has been separated and obtained from the original natural gases, such natural gases as propane and/or butane, as well as others. Such natural gases as those just mentioned are referred to in United States Letters Patent to Thompson No. 1,429,175, dated September 12, 1922, entitled Process of treating natural gas and products thereof.

The expression "natural gases" as well as the expression "combustible natural gases" used herein is intended to indicate any of the gases above indicated as natural gases; in fact any and all gases generally known as natural gases. All such natural gases have a relatively high calorific value; for example, it is quite common to find these natural gases with a calorific value of 1200 British thermal heat units or even higher per cubic foot of gas; that is, gas at 60 degrees F. temperature and 30 inches mercury pressure.

For certain uses it is not advisable or necessary to have this high calorific value. Moreover, in most of these natural gases all of the hydrocarbons therein are not entirely in the form of permanent gases for therein there are certain percentages of the hydrocarbons in mist or vaporous form, some of which can be condensed or liquefied by cooling alone or by cooling and pressure; or, they may be removed in other ways as, for example, by suitable absorption systems.

As above indicated, according to certain aspects of the invention there is to be effected a reformation—many might call it cracking—of the natural gases by subjecting them, with the entrained vapors therein if there are any or even after vapors have been removed therefrom, to a partial combustion and to the direct action of the heat of the partial combustion of the gases undergoing treatment in a manner to convert the natural gases into a fixed combustible gas of larger total volume and lower thermal or calorific value per unit of volume than the original natural gases.

By the partial combustion just referred to the thermal value of the resulting treated gas may be lower per unit volume than that ultimately desired and the present invention has certain aspects contemplating the mixing, preferably in certain predetermined portions, of natural gases on the one hand and reformed or cracked gases on the other.

One of the objects of the invention is to produce a reformed combustible fixed gas of predetermined calorific value and chemical constituency by the method and apparatus which involves the continuous, intimate and uniform mixing of gaseous combustibles, to wit, the natural gases principally composed of gaseous hydrocarbons, as methane, ethane, propane and/or butane—either alone, either two or more mixed or combined with various hydrocarbons and in various percentages or proportions relative to each other—with a combustion supporting gas, to wit, an oxygen supplying ingredient as air and effecting an incomplete combustion while maintaining an established ratio of said gaseous combustible and combustion supporting gas, thus converting the combustible gas having a high thermal value by a partial combustion of the gaseous combustible and combustion supporting gas and by the direct influence of the heat created by the partial combustion into a fixed combustible gas of larger volume but of lower thermal or calorific value per unit of measure—per unit of volume—than that of the gaseous combustible from which the reformed gas was made, and this process is one capable of being carried out without the production of free carbon or lamp black.

According to one aspect the invention is carried out in an apparatus having a reforming zone with a hot zone therein and within which apparatus the combustion supporting gas as, for example, air is heated by the sensible heat of the hot gases leaving the reforming zone by means of a suitable heat interchanger, and within which apparatus the mixture of combustible and heated combustible gas is thereafter further heated prior to its delivery into the hot zone of the reforming zone and within which said hot zone partial combustion and cracking into fixed gas of lower thermal value per unit of measure takes place.

For the purpose of this invention the expression "natural gases" and the expression "combustible natural gases" is to be construed the equivalent of each other and each is to be broadly construed as covering anything which may be nothing more than a single natural combustible gas, as butane, or any gaseous substance or composition which includes in the main any one, two, or more natural combustible gases.

As illustrative of the manner in which the invention may be realized reference is made to the drawings forming a part of this specification and in which drawings, Figure 1 is an elevation partly in section showing the general arrangement of the gas reformer. The gas reformer as shown is an apparatus having a gas reforming chamber which when the apparatus is in normal operation provides a hot reforming zone wherein natural gases are reformed by a process that includes the continuous mixing of air which preferably has been preheated and the natural gases, the further heating of the mixture while conducting it toward and into the hot reforming zone and therein permitting or allowing partial combustion and cracking to take place, and continuously withdrawing the reformed gases from the apparatus. The apparatus is provided with suitable off-take piping for the withdrawing from the hot reforming zone of the reformed gases and the apparatus is preferably provided with heat interchanging means associated with the off-take piping whereby there can be a transfer of heat to the incoming air from the hot reformed gases as the latter are passing outwardly through the off-take piping. The structure providing the reforming chamber wherein the reforming zone is located is shown in vertical section in this Figure 1 and is a view taken as on the line 1—1 of Figure 2 or on line 1—1 of Figure 3 looking in the direction of the arrows.

Figure 2 is a horizontal section of the structure providing the reforming chamber and is a view taken as on the line 2—2 of Figure 1 looking in the direction of the arrows.

Figure 3 is a vertical section of the structure providing the reforming chamber and is a view taken as on the line 3—3 of Figure 2; it is also a section taken as on the line 3—3 of Figure 1 looking in the direction of the arrows.

Figure 4 is a partial elevational or vertical view showing in detail the piping construction by which the preheated air and gas are mixed. This view also shows the upper portion of the pipe or conduit by which the mixture is conducted toward and into the reforming zone of the reformer and within which pipe or conduit the mixture is further heated or superheated while in transit.

Figure 5:
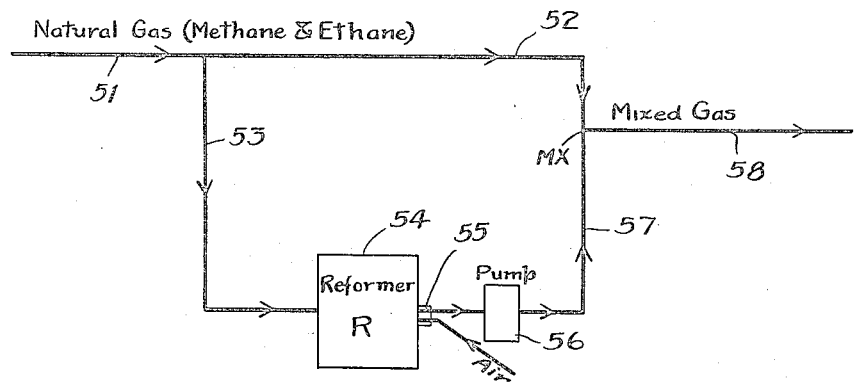

Figure 5 is a diagram of a system according to which one portion of natural gas from a suitable supply is reformed and thereafter mixed with another untreated portion of the gas from the same supply, thus producing a mixture of natural unreformed gases and the reformed gas, which mixture may have a desired or predetermined calorific value and is larger in volume than the original natural gases employed and which mixture has a heating value per cubic foot or unit volume less than that of the natural gases employed.

Figure 6:
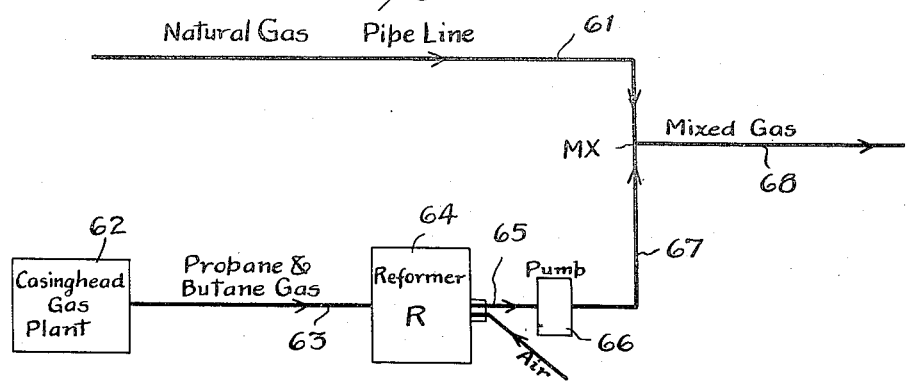

Figure 6 is a diagram of a system according to which natural gases produced in a casinghead gas plant—natural gases consisting largely of propane and butane—are reformed and thereafter mixed with natural gases from another source.

Figure 7:
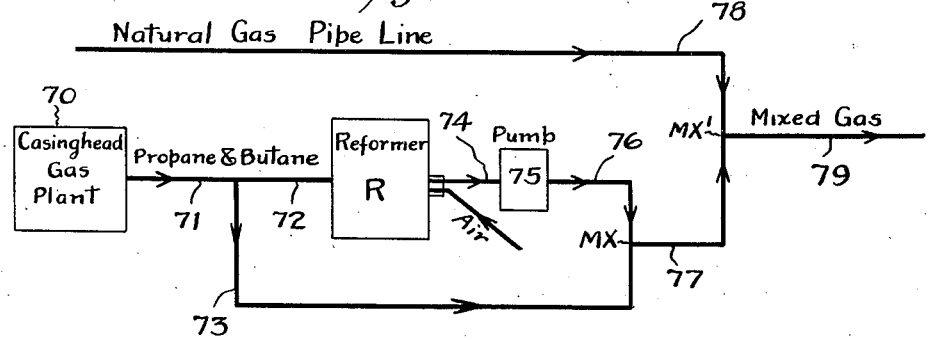

Figure 7 is a diagram of a system according to which one portion of natural gases produced in a casinghead gas plant—natural gases consisting largely of propane and butane—is reformed, then mixed with another portion of untreated natural gases from the same source, and thereafter the resulting mixed gases are mixed with natural gases from another source.

Figure 8 is a diagram of a system according to which one portion of natural gases produced in an oil cracking plant—natural gases consisting largely of methane and ethane—is reformed, then mixed with another portion of untreated natural gases from the same source, and thereafter the resulting mixed gases are mixed with natural gases from another source.

Figure 9 is a diagram of a system according to which one portion of natural gases produced in an oil cracking plant—natural gases consisting largely of methane and ethane—is reformed, then mixed with another portion of untreated natural gases from another source, and thereafter the resulting mixed gases are conveyed to a gas holder for domestic or industrial distribution or use.

Figure 10 is a diagram of a system according to which in respect to natural gases en route to pumping means there is a portion diverted, reformed and thereafter mixed with the remaining untreated portion prior to passing through the pumping means.

It will here be noted that Figures 5 to 10 inclusive illustrate diagrammatically how the gas reformer of Figures 1 to 4 inclusive and the reformed gas therefrom can be commercially brought into operative association with various types of natural gas supplies and various types of natural gases. Therefore, the construction of the gas reformer of Figures 1 to 4 inclusive, mode of operation, the process carried out therein, and the types of product produced thereby and therein will be described fully and in detail before further reference is made to the arrangement and functioning of the system or plants of Figures 5 to 10 inclusive. Reference will now be made to the drawings in detail.

*Gas reformer of Figures 1 to 4 inclusive*

The gas reformer or gas reforming apparatus, as the gas reforming system as a whole may be referred to, is herein designated by R. It includes the gas reforming chamber 1 which is provided with a refractory lining, as 2, that is surrounded with heat insulating material, as 3. The gas reforming chamber is provided with a gas tight metallic casing or shell 4 having a suitable removable cover 5 held in place in any suitable manner. This casing or shell 4 is provided with suitable doors, as 6 and 7, normally closed but which can be removed or opened in order to permit access to the interior of the gas reforming chamber 1. The interior space defined by the refractory lining 2 may be referred to as a gas reforming zone or reforming zone X. The zone X as a whole is frequently referred to as the hot gas reforming zone since it is maintained hot during and by the normal functioning of the gas reforming process. There is preferably located within the zone X heat storing members, as checker work of refractory brick b which with the refractory lining 2 tend to stabilize by the absorbing and giving off of heat the normal heat conditions in and for the reforming zone. It will be noted, however, as will later more fully appear, that the heat for maintaining the process is derived from the partial combustion that takes place within the reforming zone X. The general lower portion of this reforming zone X provides the hottest section of this zone and may be referred to as the hot section of the reforming zone X. The exact location of this hot section in the reforming zone is dependent largely upon the mode of operation and rate of capacity; in other words, the general location of this hot section rises as the capacity of the particular apparatus is increased.

The natural gases to be reformed may come from any suitable source of supply as, for example, from a pressure tank designated by 8. The combustion supporting gas for supplying the oxygen used in the process, for example air, may also come to the apparatus from any suitable source of supply, as through pipe 9. The air and the gas each preferably pass from its respective source of supply through a suitable pressure regulating means, as 10 for the air and 11 for the gas. This pressure regulating means in conjunction with certain members of the mixing means M, which members are hereinafter described in detail, can be relied upon to ensure a delivery of the proper proportions of gas and air into the gas reforming zone; in other words, the construction of the pressure regulating means 10 and 11 and the mixing means M is such that the proper proportions of the gas relative to the air can always be maintained. The natural gases from the pressure tank 8 flow through the pressure regulating means 11, piping 12 having a valve 13 therein, to a constricted delivery nozzle or tip 14 providing a defined area or opening through and from which the natural gases are delivered into the hot or preheated incoming air. The air for the process flows through the pressure regulating means 10, piping 15 having a valve 16, to and through a heat interchanger 17 and from the said heat interchanger 17 the heated air—frequently called the preheated air—passes through piping 18 and 19 into and through the piping T 20 which surrounds the delivery nozzle or tip 14 heretofore referred to. The hot air from T 20 passes into pipe 21 past the delivery nozzle or tip 14 and at or near the delivery end of the said tip this air and gas commence to diffuse and mix and the mixed air and gas flow downwardly for a substantial distance along pipe or conduit 21 and 21a from which the mixture is delivered into the bottom of the reforming zone X.

In order that air may be delivered with velocity and sufficient accuracy as to volume to the incoming gas there is provided an orifice disk or plate 22 arranged in cooperative relation with respect to the delivery end of the nozzle or tip 14 so as to provide a defined area for the passage of the air. The air is preferably delivered at a higher velocity than the gas in order to promote an intimate and rapid mixing of the air and gases.

The mixture of gases and air which is delivered to the reforming zone X undergoes therein partial combustion and cracking, thus producing therein the ultimate desired reformed gas. The temperature within this reforming zone and the proportions of gas and air with respect to each is regulated according to the characteristics of the gases undergoing treatment and according to the characteristics desired for the reformed gases. The resulting or reformed gas passes upward from the reforming zone X into the gas off-take cross 23, through off-take piping which includes piping members 24, 25, 26, 27 and 28, a water sealing tank 29 and piping 30, and also relief piping 31 having thereupon a relief valve 32, the piping 24 constituting part of the heat interchanger 17. It will be noted that the heat from the off-going gases passing through piping 24 is readily transmitted by any suitable construction to the inflowing air passing from the piping 15 through heat interchanger 17 and piping 18 on its way to the interior of the reforming zone X. Suitable pyrometer openings— which are normally sealed and gas tight— are provided as at 33 and 34. It will here be remarked that the temperatures within the reforming zone are maintained within ranges approximately 1450 degrees F. to 1700 degrees F. dependent, as previously indicated, upon the character of the combustible gas used, the character of the gas desired and the rate of gas make. Inspection openings or "sight cocks" are provided, as at 35 and 36. These openings have suitable glass closures, as at 35' and 36', or other transparent medium whereby heat conditions within the reforming zone may be inspected by the eye.

To start up the gas reformer or the gas reforming apparatus, as the gas reforming system as a whole may be referred to, the natural gases and the air are fed through the respective conduits to the mixing device M in such proportions as to produce nearly complete combustion when the mixture is ignited, as by torch flame inserted through a sight hole as 36. During this heating up period secondary air is admitted at connections, such as 37, to furnish sufficient air for complete combustion of all the combustibles. In this way the gas reforming apparatus is quickly brought to the required reforming temperature. The combustion products resulting from the heating up process is conducted from the hot reforming zone X—from the interior of the structure defining said zone— through the gas off-take piping 24, 26, 29, 31 and are allowed to escape through the relief valve 32. In short, the pipe 31 and the valve 32 may be referred to respectively as stack and stack valve. When the temperature of the gas reformer has attained the desired heat and is ready for the gas reforming process, viz., when the temperature within the reforming zone and of the structure defining the same is for example 1500 degrees F., and which temperature of 1500 degrees F. for certain gases and conditions is a normal temperature, then the proportion of combustibles and air is changed to the proper ratio, the secondary air is cut off, the stack valve 32 is closed and the reforming of the combustible natural gases commences. When normally operating the reformed gas leaves the reforming chamber passing successively through piping 24, which is within or a part of the heat interchanger 17, piping members 25, 26, 27, dip piping 28 that extends below the top of and into the water within water seal tank 29 and pipe 30 leading from the casing of the water seal construction to any desired destination. Assuming the gas reformer started up and in normal operation there will now be described somewhat in extended detail the process as actually carried out therein.

The gaseous combustibles, to wit, the natural gases, and the combustion supporting gas, to wit, any suitable oxygen providing gas, for example air as it exists in its natural state or when enriched or treated so that the percentage of oxygen therein is greater than that in the air when in its natural state or, for example, relatively pure oxygen should that be produced sufficiently cheap to make its use commercially practicable, are supplied—preferably continuously—from the respective supplies, through the respective conduits or piping to the mixing device M shown in Figures 1 and 4. If relatively pure oxygen is used as the oxygen-providing gas, it will be necessary or advisable to employ it under certain guarded or controlled conditions so as to prevent an intense localized heating, which would otherwise have a detrimental effect both upon the reforming apparatus and the process. More specifically the natural gases are continuously supplied from any suitable source, as from pressure tank 8, and flows past the pressure regulating means through piping 12 containing the valve 13, and finally leaves the piping 12 through the constricted nozzle or tip 14 of the mixing device M. This nozzle or tip 14 directs the natural gases into the hot combustion supporting gas, to wit, the preheated air. The air is supplied through the piping containing the regulating valve 10. The natural gases and the air are supplied so that the ratio or proportions of the one with respect to the other remains constant. The air passes through the heat interchanger 17. In other words, in the construction shown the air passing through the heat interchanger passes around the piping 24 which is maintained hot by the heat from the outgoing hot gases leaving the reforming chamber with the result that the incoming or inflowing air is preheated by the heat imparted from the outgoing hot reformed gases.

The air thus preheated enters the T member 20 and finally leaves through a defined area, to wit, the area or space between and defined by the outside portion of the tip 14 and the orifice defining portion of the orifice disk 22. It will be noted that this defined area for the delivery of the air is near the place where the natural gases from tip 14 are delivered into the preheated air and it is at or near the place where an intimate mixing of the air and natural gases begins. Preferably the air and gases are delivered into the mixer M at different velocities and this tends to further hasten the intimate mixing. The mixture continues to travel downwardly through pipe or conduit 21 and 21a and for a substantial distance the travel within the pipe or conduit 21a is under the heating influence of the reforming zone and the hot gases therein or on their way therefrom. During this downward travel within the pipe or conduit 21a the intimate mixing continues until a relative uniform mixture results and also on the downward travel a further substantial amount of heat is added to the mixture and the mixture may be considered as becoming superheated. The rate of downward flow is greater than the rate of flame propagation and the hot mixture when delivered from the bottom of the pipe or conduit 21a into the already hot reforming zone undergoes partial combustion that takes place within the reforming zone and which partial combustion maintains hot the reforming zone and the structure defining the reforming zone. The combustion supporting gas, to wit, air, mixed with the natural gases is supplied in such quantities as will support only a partial combustion; in other words, it is supplied in such quantities as to produce when the resulting partial combustion takes place and is effected within the reforming zone a temperature which is approximately within the range of between 1450 degrees F. and 1700 degrees F., the particular temperature being dependent primarily upon the characteristics of the natural gases being reformed, the characteristics of the natural gases desired, and the rate of operation.

The temperature of the reformer is maintained by the heat liberated from partial combustion of the gases so long as the proper portions of the natural gases and the air are held constant.

I have found by actual test that results obtained when reforming a gaseous hydrocarbon composed principally of 80% methane and 20% ethane, having a total heating value per cu. ft. of 1170 B. t. u. are as follows:

| | Percentage by volume |
|---|---|
| Carbon dioxide | 2.1 |
| Unsaturated hydrocarbons | 1.7 |
| Oxygen | 0.5 |
| Carbon monoxide | 11.1 |
| Hydrogen | 12.8 |
| Methane | 19.7 |
| Nitrogen | 52.1 |
| B.t.u. per cu. ft. (calculated) | 320.0 |
| B.t.u. per cu. ft. (calorimeter) | 322.0 |
| Temperature of reformer | 1500–1700 degrees F. |
| Specific gravity | .78 |

The volume increase measured under standard condition of 60 degrees F. and 30 inches of mercury pressure was 3.33. The total heating value of the reformed gas was slightly over 90% of the heating value of the combustible natural gases, and the natural gases were converted into reformed gas without the production of free carbon in the reformer.

The results obtained when reforming propane and butane (consisting principally of propane) were as follows:

| | Percentage by volume |
|---|---|
| Carbon dioxide | 2.1 |
| Unsaturated hydrocarbons | 6.9 |
| Oxygen | 0.1 |
| Carbon monoxide | 12.4 |
| Hydrogen | 11.6 |
| Methane | 11.3 |
| Nitrogen | 55.6 |
| B. t. u. per cu. ft. (calculated) | 345.0 |
| B. t. u. per cu. ft. (calorimeter) | 340.0 |

Temperature of reformer 1400–1600 degrees F.

The volume increase measured under standard conditions of 60 degrees F. and 30 inches Hg was 7.1; 90% was the thermal conversion efficiency. No free carbon was produced.

I believe I am the first to reform a substance or substances which is or are in gaseous form—gases—at normal temperature of 60 degrees F. and at normal atmospheric pressures, to wit, at 30 inches of mercury:

(a) By intimately mixing such substance or substances in gaseous form, that is such gases, with a combustion supporting gas, specifically air—preferably but not necessarily preheated—and which combustion supporting gas or air is sufficient in amount to support partial combustion only or in other words is insufficient in amount to support complete combustion;

(b) By continuously conveying such mixture toward and conducting it to a hot reforming zone—while preferably but not necessarily adding heat to said mixture being thus conducted;

(c) By directing said mixture into the hot reforming zone and which zone is preferably maintained at a temperature within the range of approximately 1450 degrees F. to 1700 degrees F. as the result of the heat given off from and by the partial combustion which takes place within said hot reforming zone and thus producing the reformed gas within said zone without the production of lamp black or free carbon; and (d) By withdrawing the reformed gas from the hot gas reforming zone, the withdrawing of the hot reformed gas being preferably carried out in such manner that heat is transferred from the gases being withdrawn, to wit, from the off-going gases, to the incoming combustion supporting gas—to the incoming air, that is used in or for the mixture; and it is to be understood that I claim broadly the invention which enables to be realized the reforming of and producing of such fixed combustible gases within such specified temperature range so that there is produced when the invention is realized a reformed gas of larger total volume but of lower calorific value per unit of measure than the original gases employed.

Such gaseous substances as those preferably employed have a calorific value of 1000 to 3500 British thermal units (B. t. u.) per cubic foot at normal temperature of 60 degrees F. and normal atmospheric pressure of 30 inches of mercury, and therefrom by the process above described I am able to produce a reformed gas having a calorific value as desired of from approximately 250 to 650 B. t. u. per cubic foot at normal temperatures of 60 degrees F. and normal atmospheric pressure of 30 inches of mercury.

Systems or plants of Figures 5 to 10 inclusive

Each of the systems of Figures 5 to 10 inclusive employ a gas reforming process such as fully described in connection with Figures 1 to 4 inclusive and the gas reformer R of each of the Figures 5 to 10 inclusive is the same in essentials of construction, function and mode of operation as the gas reformer shown and fully described in connection with Figures 1 to 4 inclusive.

System of Figure 5

This figure illustrates diagrammatically a system whereby a certain portion of the natural gases in line 51 undergoes the gas reforming process or treatment above described in connection with Figures 1 to 4. Said portion is conducted from line 51 through line 53 to the gas reformer R which functions as previously described in respect to Figures 1, 2, 3 and 4 to reform that portion of the natural gases thus supplied to the reformer R. The resulting gases from the reformer are conducted through line 55 to pump 56 and thence through line 57 to a mixing point MX at which point the untreated natural gases in line 52 meet and are mixed with the reformed gas or gases, preferably in a predetermined proportion. Thereafter said mixed gases are then conducted through line 58 as for general distribution or industrial use.

System of Figure 6

This figure illustrates diagrammatically a system whereby natural gases from one source as indicated by line 61 are mixed with a reformed gas generated from a natural gas or gases from another source which source may be a casinghead gas plant, indicated by block 62, where residue gases, such as consists largely of propane and butane, are produced. The said residue gases are conducted from source 62 through line 63 to the reformer R and treated or refomed in a manner previously described in respect to Figures 1, 2, 3 and 4, and the resulting reformed gases are conducted through line 65 to pump 66, to line 67, to a mixing point MX at which point the natural gases in line 61 meet and mix with the reformed gases, preferably in a predetermined proportion. Thereafter said mixed gases are conducted through line 68 as for general distribution or industrial use.

System of Figure 7

This figure illustrates diagrammatically a system whereby a certain portion of residue gases, such as consist largely of propane and butane, produced in a casinghead gas plant 70 are conducted from the plant through line 71 and 72 to a reformer R and treated or reformed in a manner previously described in respect to Figures 1, 2, 3 and 4, and the resulting reformed gas or gases are conducted through line 74 to pump 75 and line 76 to a point MX at which point the untreated gases from lines 71 and 73 meet and mix with the reformed gases in predetermined proportions so as to produce the desired heating value. The mixed gases are then caused to flow through line 77 to point MX' at which point natural gases from another source and supplied through line 78 meet the mixed gases and at this point the mixed gas from line 77 is further mixed with the natural gases from line 78 and the final mixture is then conducted through line 79 as for general distribution or industrial use.

System of Figure 8

This figure diagrammatically illustrates a system whereby certain portions of residue natural gases, such as consist largely of methane and ethane, produced in an oil cracking plant 80 are conducted through lines 81 and 82 to a reformer R and treated or reformed in a manner as described in respect to Figures 1, 2, 3 and 4, and the resulting reformed gas or gases are conducted through line 84 to pump 85 thence through line 86 to point MX. At point MX untreated gases conducted from line 81, through line 83 and reformed gases from line 86 meet and are mixed in predetermined proportions to obtain a mixture having a desired heating value. This mixture is then allowed to flow to a point MX' at which point natural gases in and from line 88, to wit, natural gases from another source, meet and are mixed with the mixed gas from line 87. The final mixture then flows from MX' through line 89 as for general distribution or industrial use.

System of Figure 9

This figure diagrammatically illustrates a system whereby a certain portion of residue gases which are in effect natural gases, such as consist largely of methane and ethane, produced in an oil cracking plant 90 are conducted therefrom through line 91 and 92 to a reformer R and treated or reformed in a manner previously described in respect to Figures 1, 2, 3 and 4. The resulting reformed gas or gases are conducted through line 94 to a point MX at which point the untreated gases from line 91 are conducted through line 93, meet and mix with the reformed gases in predetermined proportions to obtain a mixture having a desired heating value per unit of volume. The mixed gases are then allowed to pass through line 97 to gas storage holder 98 and thence to line 99 as for domestic or industrial distribution or use.

System of Figure 10

This figure diagrammatically illustrates a system whereby a certain portion of natural gases, consisting largely of combustible gases such as methane and ethane in line 100, enroute from wells or other source, through pipes 100, 105 and 104 to a pumping station 101, are diverted, conducted through line 102 to a reformer R, and treated or reformed in a manner as described in respect to Figures 1, 2, 3 and 4. The resulting reformed gases are conducted from the reformer R through line 103 to point MX in line 104 on the suction side of the pumps in the pumping station, at which point MX the untreated gases from line 100 and passing through line 104 are mixed in predetermined proportions with the reformed gases. The mixed gases are pumped by the pumps in the station 101 into the high pressure line 106 as for general distribution. Valve 105 is preferably set to regulate and produce the desired relative pressure conditions in lines 102 and 103.

In view of the explanations and descriptions already given it is believed that further elucidations in respect to the functioning and mode of operation of the system of Figures 5 to 10 inclusive are unnecessary.

From what has preceded it will be noted that the temperature of the hot reforming zone is above 1000 degrees F. and is sufficient to effect the reforming of at least a part of the material undergoing treatment under the direct influence of the heat of the partial combustion that takes place in the hot reforming zone, without the production of carbon black—sometimes referred to as lamp black—and that from the reforming zone there is a withdrawal of the fluid products resulting from the process. It will be further pointed out that in certain instances the materials used in the process may be referred to as an admixed material consisting mainly of a paraffin hydrocarbon substance lighter than pentane and which is mixed with combustion supporting gas. Those paraffin hydrocarbons sometimes referred to as lighter than pentane are such as butane, propane, ethane, and methane, or mixtures thereof.

The improvements herein set forth are not limited to the precise construction and arrangement shown and described for it will be appreciated that they may be realized in various forms, ways and modifications without departing from the spirit and scope of the invention.

By reforming of combustible natural gases having characteristics such as are earlier pointed out and according to the process or processes herein outlined, there results, and is or are produced, reformed combustible gas or gases having characteristic features as herein pointed out among which there exists the following which can well be mentioned because of their prominent aid in defining certain fundamental and underlying aspects incident to the invention that is the basis and foundation of this application and of any and all patents based thereupon or resulting from the disclosures thereof, and in this connection, mention is made of the following facts:

(a) That the process is one capable of being carried out as a continuous process but according to the broader aspects of the invention, the process is not limited to a continuous process, (b) That the process is one carried out under conditions so that the temperature of the zone wherein the gas reforming takes place is within a range of approximately of 1450 degrees F. to 1700 degrees F., dependent upon the nature of the natural gas employed as the basic gas for the reforming process and also upon the composition and calorific value of the reformed gas desired, (c) That the process is one which can be carried out without the supplying of heat from an independent source; namely, without the supplying of additional heat to the reforming chamber from an external source, or in other words, according to the process of the present invention, all of the heat required for the process is preferably derived solely as the result of and from the incomplete combustion which is carried out for effecting the reforming process or reforming reaction and which heat involved in the reaction because of the partial combustion is sufficient to maintain the desired temperature within the reforming chamber, (d) That the reforming process can be and is carried out substantially without the formation of free carbon, or otherwise expressed, without the production and/or precipitation of lamp black, (e) That in the resulting gas; namely, the reformed natural gas, the volumetric ratio of the carbon monoxide to hydrogen is approximately 1 to 1. In any event, in the reformed gas resulting from the process, the hydrogen volume therein as compared with the carbon monoxide volume is substantially less than is the hydrogen volume wherein the volumetric ratio of carbon monoxide to hydrogen is 1 to 2 or 1 to more than 2, and (f) That in the resulting gas; namely, the reformed natural gas, there is contained a substantial percentage by volume of methane—this characteristic feature being manifest from an inspection of the listed percentages of the different types of gas listed in the table analysis or statements appearing in foregoing parts of this specification.

What is claimed is.

1. The manufacture of a reformed combustible fixed gas of substantially uniform calorific value from combustible natural gas by the method which includes preheating a continuous inflow of combustion supporting gas containing free oxygen, continuously and uniformly mixing according to a predetermined ratio said combustible natural gas with the preheated inflowing combustion supporting gas but in quantity sufficient to support partial combustion only, further heating said mixture while it is being continuously conducted to a hot gas reforming zone that has a portion which is maintained at a predetermined maximum temperature within a range of approximately 1450 degrees F. to 1700 degrees F. dependent upon the nature of the combustible natural gas used and upon the composition and calorific value of the reformed gas desired, continuously delivering said further heated mixture into the hot gas reforming zone and therein causing a partial combustion and consequent reforming of the natural gas as a result of the partial combustion and heat generated thereby without supplying external heat, thus continuously producing a reformed gas, without the formation of free carbon, which is a fixed combustible gas of lower calorific value per unit volume and of larger volume than the natural gases from which it was produced and which contains carbon monoxide and hydrogen in an approximate volumetric ratio of 1 to 1 and also contains a substantial percentage by volume of methane, continuously withdrawing the resulting gas from the hot gas reforming zone, and passing the gas in heat exchange with said mixture and thereafter in heat exchange with the incoming combustion supporting gas.

2. The manufacture of a reformed combustible fixed gas from combustible natural gas by the method which includes preheating a continuous inflow of air, continuously and uniformly mixing according to predetermined ratio said combustible natural gas with the preheated inflowing air but in quantity sufficient to support partial combustion only, further heating said mixture while it is being continuously conducted toward a hot gas reforming zone that has a portion which is maintained at predetermined maximum temperature within a range of approximately 1450 degrees F. to 1700 degrees F., continuously delivering said mixture into the hot gas reforming zone wherein there results a partial combustion and consequent reforming without the production of free carbon of the natural gas in a manner to continuously produce a reformed gas which is a fixed combustible gas, continuously withdrawing from the hot gas reforming zone the reformed combustible fixed gas, containing approximately equal values of carbon monoxide and hydrogen and passing the gas in heat exchange with said mixture.

3. In the manufacture of a reformed combustible fixed gas from substances which are gases at temperature of 60 degrees F. and at atmospheric pressure of 30 inches of mercury the method which includes continuously mixing said gaseous substances with air in such proportions that a combustion which is only partial can follow, heating said mixture while it is continuously flowing toward and into a gas reforming zone maintained at a temperature within a range of approximately 1450 degrees F. to 1700 degrees F. by the heat liberated during the process, continuously causing or allowing the partial combustion and reforming of the gaseous substances by the partial combustion and the heat given off as the result of the partial combustion and thereby continuously producing without the production of free carbon a reformed combustible fixed gas comprising carbon monoxide and hydrogen in an approximate ratio of 1 to 1 and also methane, and which reformed combustible gas is of lower calorific value per unit volume and of larger total volume than that of the gaseous substances from which it was made, continuously withdrawing the resulting gas, and passing the gas in heat exchange with said mixture.

4. In the manufacture of a reformed combustible fixed gas of substantially uniform calorific value from gaseous hydrocarbons of the paraffin series which are in gaseous form at temperature of 60 degrees F. and at atmospheric pressure of 30 inches of mercury the method which includes preheating a continuous inflow of air, continuously and uniformly mixing said gaseous hydrocarbons with the inflowing preheated air in such proportions that continuous partial combustion follows, maintaining a predetermined ratio of said gaseous hydrocarbons and air, further heating said mixture while continuously flowing toward and into a hot reforming zone maintained at a temperature of approximately 1450 degrees F. to 1700 degrees F. by the heat liberated during the process, causing or allowing the partial combustion, reforming of the gaseous hydrocarbons by the partial combustion and the heat given off as the result of the partial combustion thereby continuously producing, without the formation of free carbon or lamp black, a reformed combustible fixed gas of larger volume and lower calorific value than that of the gaseous hydrocarbons and which reformed gas comprises carbon monoxide and hydrogen in approximately the ratio of 1 to 1 and also a substantial percentage of methane, continuously withdrawing the resulting gas, and passing the gas in heat exchange with said mixture and also in heat exchange with the inflowing air.

5. In the manufacture of a reformed combustible fixed gas of substantially uniform calorific value from gaseous hydrocarbons of the paraffin series which are in gaseous form at temperature of 60 degrees F. and at atmospheric pressure of 30 inches of mercury the method which includes supplying a continuous inflow of air, continuously and uniformly mixing said gaseous hydrocarbons with the inflowing air in such proportions that partial combustion follows when the mixture is delivered into a hot reforming zone that is maintained at a temperature within the range of approximately 1450 degrees F. to 1700 degrees F., maintaining a predetermined ratio of said gaseous hydrocarbons and air, heating said mixture while flowing toward and into the hot reforming zone which is maintained at said temperatures by the heat liberated as the result of the partial combustion, directing said preheated mixture into said hot gas reforming zone and causing the partial combustion, continuously reforming the gaseous hydrocarbons by the partial combustion and the heat given off as the result of the partial combustion thereby producing, without the formation of free carbon or lamp black, a reformed combustible fixed gas having carbon monoxide and hydrogen in approximately equal parts and also a substantial percentage of methane, and which reformed combustible fixed gas is of larger volume and lower calorific value than that of the gaseous hydrocarbons, continuously withdrawing the resulting gas, and passing the reformed gas in heat exchange with said flowing mixture to effect said further heating of the latter.

6. The manufacture of a reformed combustible fixed gas of substantially uniform calorific value from substances which are gases at room temperature of 60 degrees F. and at pressure of 30 inches of mercury and which at said temperature and pressure have calorific values of over 1000 British thermal units per cubic foot, by the continuous method which includes preheating a continuous inflow of combustion supporting gas containing free oxygen, continuously intimately and uniformly mixing said gases with the inflowing preheated combustion supporting gas while maintaining a predetermined ratio of said gases and said combustion supporting gas, further heating said mixture while flowing on its way to a hot gas reforming zone which is maintained at predetermined temperature within a range of approximately 1450 degrees F. to 1700 degrees F., dependent largely upon the nature of the gases used and upon the combustion and calorific value of the reformed gas desired, continuously delivering said further heated mixture into the hot gas reforming zone within which the partial combustion takes place and the reforming of the gases follows, thus continuously producing—without the production of free carbon or lamp black—a reformed combustible fixed gas of lower calorific value per cubic foot but of larger volume than that of the original gases and which reformed combustible fixed gas comprises a substantial percentage of methane and also substantial percentages of carbon monoxide and hydrogen in the approximate ratio of 1 to 1, and withdrawing the resulting gas while passing it in heat exchange with the mixture which is flowing on its way to the hot gas reforming zone, and also in heat exchange with the inflowing air.

7. The manufacture of a fixed combustible reformed gas from substances which are gases at temperature of 60 degrees F., and at pressure of 30 inches of mercury by the continuous method which includes intimately mixing said gases and air, heating said mixture while continuously flowing toward a hot gas reforming zone maintained at predetermined temperature within a range of approximately 1450 degrees F. to 1700 degrees F., directing the hot mixture into the hot gas reforming zone and therein causing a partial combustion to take place so that there results reforming of the gases by heat generated by the partial combustion thereby producing without the necessary employment of external heat of a reformed combustible fixed gas not accompanied by free carbon, having a substantial percentage by volume of methane and a substantial percentage by volume of carbon monoxide and hydrogen in the approximate ratio of 1 to 1, and continuously withdrawing said reformed gas from the hot gas reforming zone, but at the same time passing the reformed gas in heat exchange with the mixture which is then flowing towards the hot gas reforming zone.

8. The manufacture from combustible natural gases of a reformed combustible fixed gas of substantially uniform calorific value by the method which includes supplying a continuous inflow of combustion supporting gas containing free oxygen, continuously and uniformly mixing according to predetermined ratio said combustible natural gases with the inflowing combustion supporting gas but in quantity sufficient to support partial combustion only, conducting said mixture into a reforming zone that has a portion which is maintained at predetermined temperature within a range of approximately 1450 degrees F. to 1700 degrees F. dependent upon the nature of the combustible natural gases used and upon the composition and calorific value of the reformed gas desired, causing a partial combustion and consequent reforming of the natural gases into a reformed combustible fixed gas as the result of the partial combustion and heat generated thereby and without the formation of free carbon, and which reformed gas has a substantial percentage by volume of methane and also a substantial percentage by volume of carbon monoxide and hydrogen, and in which the carbon monoxide and hydrogen are in an approximate ratio of 1 to 1.

9. The manufacture from natural gases of a reformed combustible fixed gas of larger total volume but of lower calorific value per unit volume by the process which includes continuously mixing natural gases and air but only in proportions to support partial combustion, continuously passing the mixture into a hot reforming zone in which the temperature is maintained within a range of approximately 1450 degrees F. to 1700 degrees F. dependent largely upon the characteristics of the natural gas used and upon the composition and calorific value desired for the reformed gas, and carrying out the reforming of the gases in said hot reforming zone under the direct influence of the heat of the partial combustion resulting from the introduction of the mixture into said hot reforming zone, and continuously withdrawing the resulting reformed combustible fixed gas and thereby producing without the formation of free carbon and solely by the heat derived from the partial combustion of the reformed combustible fixed gas having a substantial amount of methane therein and substantial amounts of carbon monoxide and hydrogen in an approximate volumetric ratio of 1 to 1.

10. The process of producing a reformed combustible fixed gas from combustible hydrocarbons which are in gaseous form at 60 degrees F. and at pressures of 30 inches of mercury, which process comprises intimately mixing said gaseous hydrocarbons and combustion supporting gas containing free oxygen, subjecting the mixture to reaction in a reforming zone wherein the temperature range is approximately between 1450 degrees F. and 1700 degrees F. and thereby producing—without the production of free carbon during or incident to the reforming process—the reformed combustible fixed gas having among the other ingredients a substantial methane volume, a substantial carbon monoxide volume and a substantial hydrogen volume and in which reformed gas the carbon monoxide to hydrogen ratio approximates 1 to 1.

11. A process and resulting reformed gas as per the claim last preceding, in which the combustible hydrocarbons employed to support the process comprise as a large part thereof methane and ethane.

12. A process and resulting reformed gas as per claim 10 in which the combustible hydrocarbons employed to support the process comprise as a large part thereof butane and propane.

13. A process and resulting reformed gas as per claim 10, in which the combustible hydrocarbons for supporting the process are provided by the residue gas derived from an oil cracking plant.

14. A process and resulting reformed gas as per claim 10, in which the combustible hydrocarbons employed for supporting the process are provided by the residue gases derived from a casing head gas plant.

15. The manufacture from hydrocarbon gases comprising largely butane and propane of a combustible fixed gas by the method which includes preheating a continuous inflow of combustion supporting gas containing free oxygen, continuously and uniformly mixing according to predetermined ratio said hydrocarbon gases with the preheated inflowing combustion supporting gas but in quantity sufficient to support partial combustion only, further heating said mixture while it is being continuously conducted to a hot gas reforming zone that has a portion which is maintained at predetermined maximum temperature within a range of approximately 1400 degrees F. to 1700 degrees F. dependent upon the nature of the hydrocarbon gases and upon the composition and calorific value of the combustible fixed gas desired, continuously delivering said further heated mixture into the hot gas reforming zone and therein causing a partial combustion and consequent reforming of the hydrocarbon gases as a result of the partial combustion and heat generated thereby and without the supplying of heat to the reaction zone from an outside independent source, thus continuously producing, without the formation of free carbon or lamp black, a combustible fixed gas having carbon monoxide and hydrogen in an approximate ratio of 1 to 1 and a substantial volume of methane, and which combustible fixed gas is of lower calorific value per unit volume and of larger volume than the hydrocarbon gases from which it was produced, continuously withdrawing the resulting gas from the hot gas reforming zone, and utilizing heat of the resulting gas being withdrawn for the heating of the inflowing combustion supporting gas by passing the hot resulting gas in heat exchange with the inflowing combustion supporting gas and also with the mixture while being conducted to the hot gas reforming zone.

16. The manufacture of a reformed combustible fixed gas from the residue gases of a casing head gas plant and containing substantial percentages of propane and butane by the method which includes preheating a continuous inflow of air, continuously and uniformly mixing said residue gases with the inflowing preheated air in such proportions that continuous partial combustion follows, maintaining a predetermined ratio of said residue gases and air, further heating said mixture while continuously flowing toward and into a hot reforming zone maintained at temperatures within a range of approximately 1450 degrees F. and 1700 degrees F. suitable for the process, causing the partial combustion to take place within the hot reforming zone, reforming of the residue gases by the partial combustion and the heat given off as the result of the partial combustion thereby continuously producing, without the addition to the reforming zone of heat from an external source, and without the formation of free carbon or lamp black, a reformed combustible fixed gas having carbon monoxide and hydrogen in approximately equal volumes and also having a substantial percentage of methane, which reformed combustible gas is of larger volume and lower calorific value than that of the residue gases, and withdrawing the resulting gas in heat interchange with said mixture and the inflowing air in a manner whereby heat is imparted from the resulting gas to said mixture and the inflowing air.

17. The manufacture from hydrocarbon gases consisting largely of butane and propane of a combustible fixed gas by the method which includes mixing said hydrocarbon gases and a free oxygen containing gas sufficient to produce only partial combustion and causing the mixture to flow into a hot reforming zone wherein a temperature is maintained above 1000 degrees F.—but not substantially above 1700 degrees F.— by the resulting partial combustion without the supplying to the reforming zone of additional heat from an external source of a reformed combustible fixed gas having an appreciable methane content, and a carbon monoxide content approximately equal in volume to the free hydrogen content, effecting the reforming of the gases within said hot reforming zone under the direct influence of the heat of the partial combustion and without the production of free carbon or lamp black, and withdrawing the resulting gas from said reforming zone while passing it in heat exchange with said mixture.

18. The reforming of residue gases from a casing head gas plant and which gases contain substantial percentages of butane and propane and producing therefrom a reformed fixed gas by the method which includes mixing said residue gases and a free oxygen containing gas sufficient to produce only partial combustion and causing the mixture to flow into a hot reforming zone wherein suitable temperature range is maintained between approximately 1450 degrees F. and 1700 degrees F. while effecting the reforming of the gases within said hot reforming zone under the direct influence of the heat of the partial combustion without the supplying of additional heat from an independent source to the reforming zone and without the production of carbon black, and thereby producing a reformed gas having a substantial methane content and also having among other ingredients a substantial carbon monoxide content and hydrogen content and in which reformed gas the carbon monoxide to hydrogen ratio approximates 1 to 1, and withdrawing the resulting hot gas from said reforming zone as a reformed fixed gas.

19. The production of a combustible fixed gas according to a method employing residue gas from an oil cracking plant comprising substantial percentages of methane and ethane, and which method comprises supplying a continuous inflow of combustion supporting gas containing free oxygen, continuously and uniformly mixing according to a predetermined ratio such residue gas with the inflowing combustion supporting gas but in quantity sufficient to support partial combustion only, adding heat to said mixture while it is being continuously conducted to a hot gas reforming zone that has a portion which is maintained at a predetermined maximum temperature within a range of approximately 1450 degrees F. to 1700 degrees F. dependent upon the nature of the residue gas and upon the composition and calorific value of the reformed gas desired, continuously delivering said heated mixture into the hot gas reforming zone and therein causing a partial combustion and consequent reforming of the residue gas as a result of the partial combustion and heat generated thereby, thus continuously producing a reformed gas, without the formation of free carbon, and without the supplying to the reforming zone of additional heat from an independent external source, and which reformed gas is a fixed combustible gas of lower calorific value per unit volume and of larger volume than the residue gas from which it was produced, and comprises carbon monoxide and hydrogen in approximately equal volumes and also a substantial volume of methane, continuously withdrawing the resulting gas from the hot gas reforming zone, and passing the gas in heat exchange with said mixture.

20. The manufacture from residue gas consisting largely of methane and ethane of a combustible fixed gas by the method which includes preheating a continuous inflow of combustion supporting gas containing free oxygen, continuously and uniformly mixing according to a predetermined ratio said residue gas with the preheated inflowing combustion supporting gas but in quantity sufficient to support partial combustion only, further heating said mixture while it is being continuously conducted to a hot gas reforming zone that has a portion which is maintained at a predetermined maximum temperature within a range of approximately 1450 degrees F. to 1700 degrees F. dependent upon the nature of the residue gas and upon the composition and calorific value of the combustible fixed gas desired, continuously delivering said further heated mixture into the hot gas reforming zone and therein causing a partial combustion and consequent reforming of the residue gas as a result of the partial combustion and heat generated thereby, thus continuously producing, without the formation of carbon black and without the supplying of external heat to the gas reforming zone, a reformed gas which is a combustible fixed gas having a substantial percentage in volume of methane and also carbon monoxide and hydrogen in the approximate ratio of 1 to 1 and which reformed gas is of lower calorific value per unit volume and of larger volume than the residue gas from which it was produced, continuously withdrawing the resulting gas from the hot gas reforming zone, and passing the hot gas in heat exchange with both the inflowing mixture and the inflowing combustion supporting gas, thus utilizing heat of the resulting gas being withdrawn for first heating of said mixture and thereafter preheating of the combustion supporting gas.

21. The manufacture of a reformed combustible fixed gas by employing residue gas from an oil cracking plant and which contains substantial percentages of methane and ethane by the method which includes preheating a continuous inflow of air, continuously and uniformly mixing said gaseous hydrocarbons with the inflowing preheated air in such proportions that continuous partial combustion follows, maintaining a predetermined ratio of said gaseous hydrocarbons and air, further heating said mixture while continuously flowing toward and into a hot reforming zone maintained at sufficiently high temperatures suitable for this process but substantially not above 1700 degrees F., causing the partial combustion to take place within the reforming zone, reforming of the residue gas by the partial combustion and the heat given off as the result of the partial combustion thereby continuously producing, without the adding of heat from an outside source to the reforming zone and without the formation of free carbon or lamp black, a reformed combustible fixed gas having a substantial methane content and also having carbon monoxide and hydrogen in the approximate ratio of 1 to 1, and which reformed fixed combustible gas is of larger volume and lower calorific value than that of the residue gas, and withdrawing the resulting gas while passing it in heat exchange first with said incoming mixture and afterwards with the incoming air in a manner whereby heat is imparted from the hot gas to the inflowing mixture and thereafter to the inflowing air so as to preheat the latter.

22. The method which comprises uniformly admixing combustible natural gas constituents consisting mainly of hydrocarbon substances lighter than pentane with a combustion supporting gas sufficient to produce only partial combustion and causing said natural gas constituents and said combustion supporting gas to flow into a hot reforming zone wherein a high temperature is maintained by the resulting partial combustion sufficient to effect the reforming of at least a part of said natural gas constituents under the direct influence of the heat of the partial combustion without the production of carbon black and without the supplying of additional heat derived from an external source and thereby producing a fixed combustible reformed gas having a substantial methane content and also among other ingredients a substantial carbon monoxide content and a substantial hydrogen content and in which gas the volumetric ratio of carbon monoxide to hydrogen is approximately 1 to 1, and withdrawing from the hot reforming zone the fluid products resulting from said process, the method being a continuous one in which heat of the fluid products withdrawn from the hot reforming zone is imparted to the mixture of combustion supporting gas and admixed combustible natural gas constituents for the purpose of preheating the same.

23. The method which comprises admixing material consisting mainly of a paraffin hydrocarbon substance lighter than pentane with a combustion supporting gas containing free oxygen sufficient to produce therewith only partial combustion and causing said material and gas to flow into a hot reforming zone wherein a high temperature is maintained within a range of approximately 1450 degrees F. to approximately 1700 degrees F. by the resulting partial combustion, sufficient to effect without the employment of any heat other than that derived from the partial combustion the reforming in the hot reforming zone of the paraffin hydrocarbon substance thus admixed with the combustion supporting gas while under the direct influence of the heat of the partial combustion and without the production of carbon black of fluid products comprising among other ingredients thereof substantial amounts of methane, carbon monoxide and hydrogen with the carbon monoxide and the hydrogen bearing an approximate ratio of 1 to 1 in respect to each other, and withdrawing from the hot reforming zone the fluid products resulting from said process.

24. The method which comprises admixing material consisting mainly of a paraffin hydrocarbon substance lighter than pentane with a combustion supporting gas containing free oxygen sufficient to produce therewith only partial combustion and causing said material and gas to flow into a hot reforming zone wherein a temperature above 1000 degrees F.—but not substantially above approximately 1700 degrees F.—is maintained by the resulting partial combustion, sufficient to effect in the hot reforming zone and without supplying additional heat from an external source the reforming of at least a substantial part of said material under the direct influence of the heat of the partial combustion without the production of carbon black of fluid products that among other ingredients thereof include a substantial percentage by volume of methane, and also carbon monoxide and hydrogen in approximately equal parts, and withdrawing from the hot reforming zone the fluid products resulting from said process.

WILLIAM F. FABER.